(12) United States Patent
Hathaway

(10) Patent No.: US 10,785,839 B2
(45) Date of Patent: Sep. 22, 2020

(54) THERMAL BALLAST

(71) Applicant: Kevin Joseph Hathaway, Saratoga, CA (US)

(72) Inventor: Kevin Joseph Hathaway, Saratoga, CA (US)

(*) Notice: Subject to any disclaimer, the term of this patent is extended or adjusted under 35 U.S.C. 154(b) by 0 days.

(21) Appl. No.: 16/558,090

(22) Filed: Aug. 31, 2019

(65) Prior Publication Data

US 2019/0387592 A1 Dec. 19, 2019

Related U.S. Application Data

(63) Continuation-in-part of application No. 15/999,700, filed on Aug. 20, 2018, now Pat. No. 10,405,391, which is a continuation-in-part of application No. 15/635,143, filed on Jun. 27, 2017, now abandoned.

(60) Provisional application No. 62/355,181, filed on Jun. 27, 2016.

(51) Int. Cl.
  *G02B 6/08* (2006.01)
  *H05B 45/10* (2020.01)
  *F21V 8/00* (2006.01)

(52) U.S. Cl.
  CPC ............ *H05B 45/10* (2020.01); *G02B 6/009* (2013.01); *G02B 6/0068* (2013.01); *G02B 6/0073* (2013.01); *G02B 6/0085* (2013.01)

(58) Field of Classification Search
  None
  See application file for complete search history.

(56) References Cited

U.S. PATENT DOCUMENTS

| | | | |
|---|---|---|---|
| 3,834,456 A * | 9/1974 | Clarke | C09K 5/063 165/104.17 |
| 7,368,977 B2 | 5/2008 | Wei et al. | |
| 7,731,379 B2 | 6/2010 | Wakalopulos | |
| 8,459,839 B2 | 6/2013 | Wakalopulos | |
| 8,471,997 B2 | 6/2013 | Yang et al. | |
| 9,516,485 B1 | 12/2016 | Bowers et al. | |
| 2002/0033247 A1* | 3/2002 | Neuschutz | F28D 20/02 165/10 |
| 2001/0162339 | 11/2002 | Harrison | |
| 2012/0188481 A1 | 7/2012 | Kang et al. | |

(Continued)

*Primary Examiner* — Dedei K Hammond
(74) *Attorney, Agent, or Firm* — Donald E. Schreiber

(57) ABSTRACT

A thermal ballast temporarily stores heat generated during a heat generating device's operation thereby extending the device's operating time during an interval of adverse thermal operating condition. The thermal ballast (10) includes:
 a. a highly thermally conductive layer (42) that is adapted for being thermally coupled to the heat generating device; and
 b. a high heat capacity layer (44) that is laminated to the high thermal conductivity layer (42).
The high heat capacity layer (44) may be formed from a solid piece of a suitably chosen material. Alternatively, the high heat capacity layer (44) may be formed from a piece of a suitably chosen material having a cavity that is filled with a material (46) which changes phase at a temperature below the heat generating device's maximum operating temperature. Disclosed are various different ways for infusing the material (46) which changes phase at a temperature below the heat generating device's maximum operating temperature into the high heat capacity layer (44) and retaining the material (46) therein.

18 Claims, 17 Drawing Sheets

(56) References Cited

U.S. PATENT DOCUMENTS

| | | |
|---|---|---|
| 2012/0273920 A1* | 11/2012 | Fedorov ................ H01L 23/373 257/532 |
| 2014/0043565 A1 | 2/2014 | Ma |
| 2014/0160099 A1 | 6/2014 | Li et al. |
| 2014/0320776 A1 | 10/2014 | Taheri et al. |
| 2015/0002781 A1 | 1/2015 | Ma |
| 2015/0109560 A1 | 4/2015 | Guo et al. |
| 2015/0146133 A1 | 5/2015 | Ning et al. |
| 2015/0190796 A1* | 7/2015 | Bedel ................... B01J 37/0238 518/715 |

\* cited by examiner

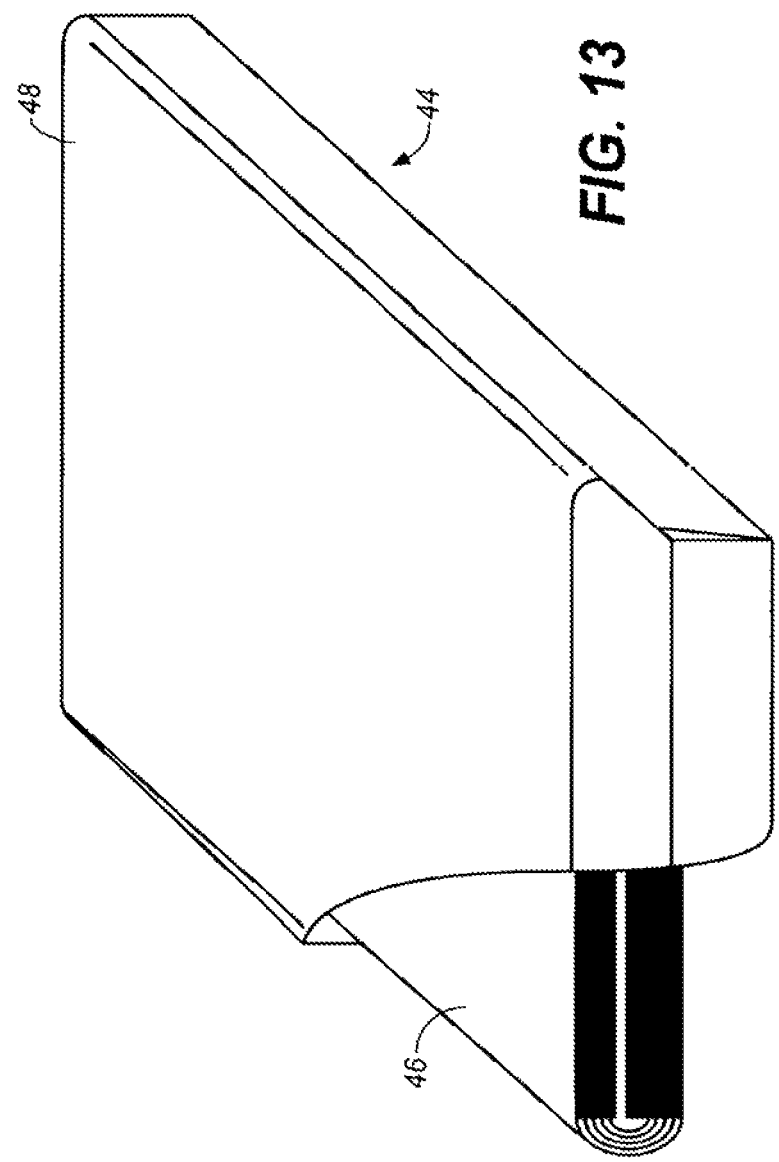

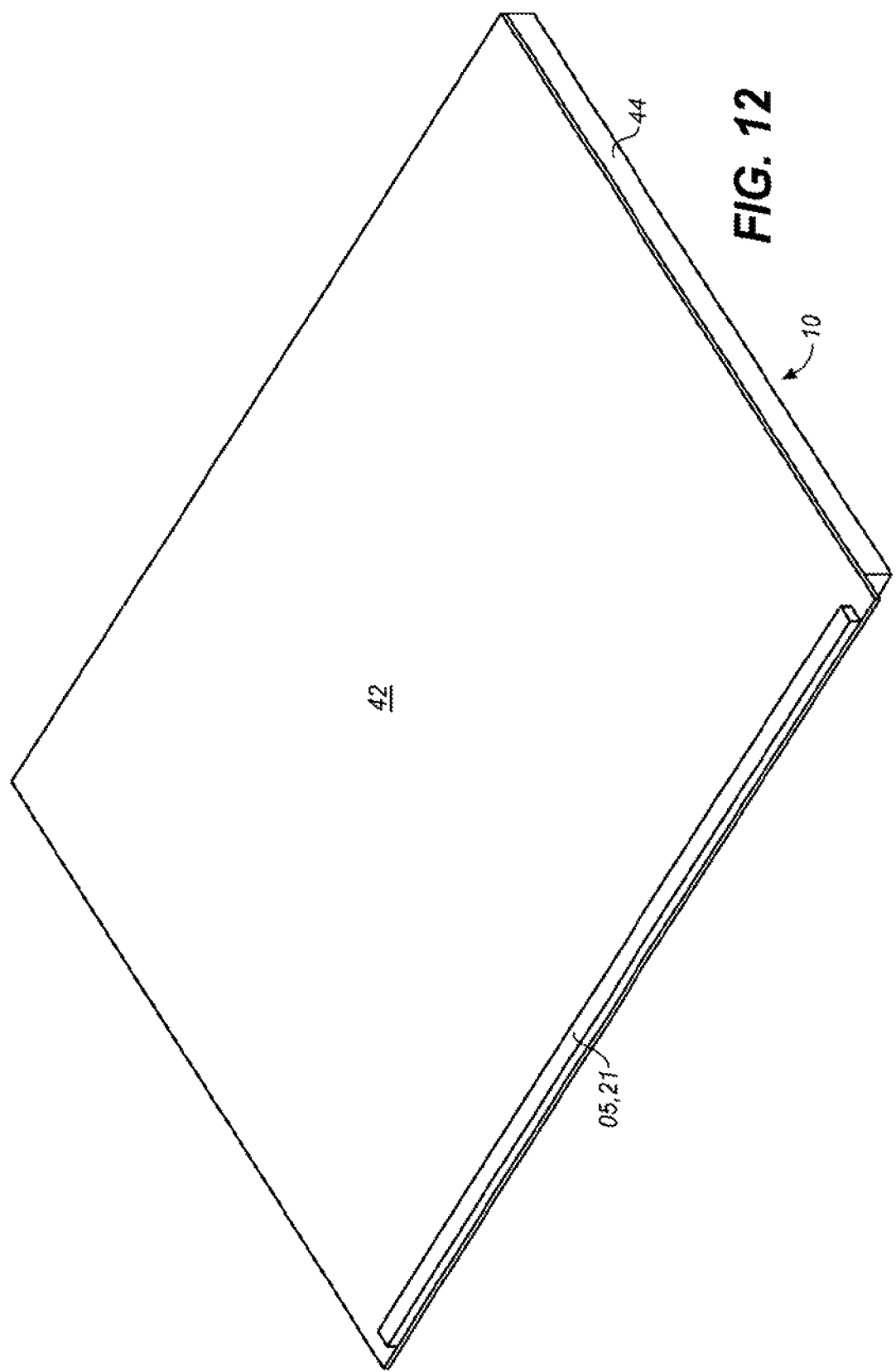

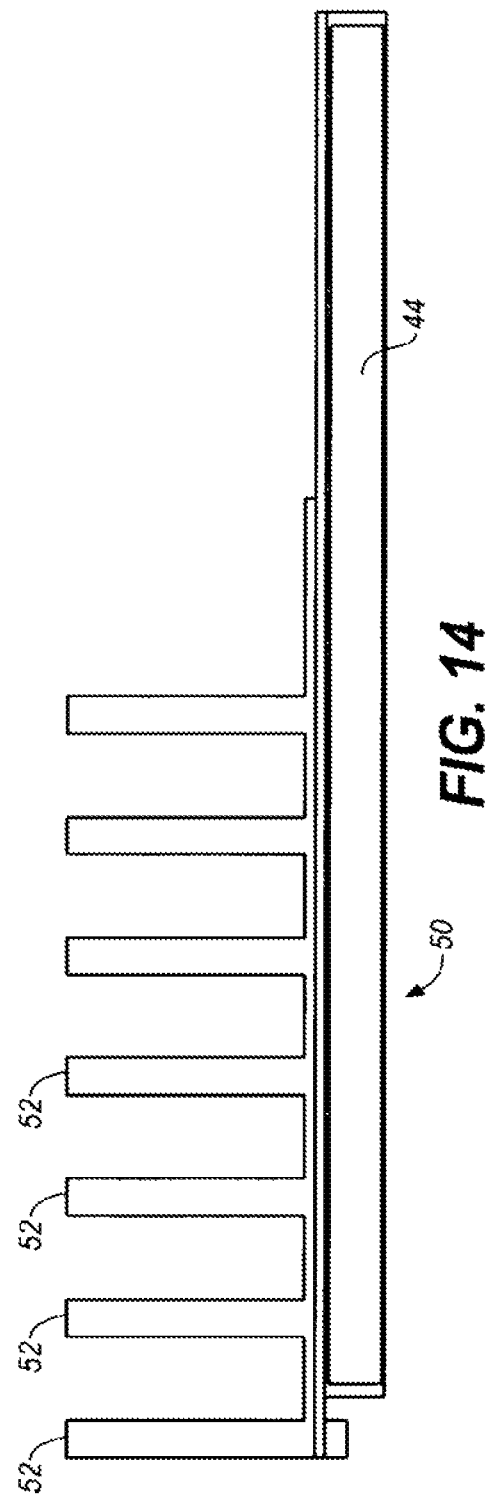

THERMAL BALLAST

CROSS REFERENCE(S) TO RELATED APPLICATION(S)

This patent application is a continuation-in-part of U.S. patent application Ser. No. 15/999,700 that was filed with the United States Patent and Trademark Office ("USPTO") on Aug. 20, 2018, as a continuation-in-part of U.S. patent application Ser. No. 15/635,143 that was filed with the USPTO on Jun. 27, 2017, claiming the benefit of U.S. Provisional Patent Application No. 62/355,181 that was filed with the USPTO on Jun. 27, 2016.

BACKGROUND

Technical Field

The present disclosure relates generally to liquid crystal displays ("LCDs"), and more particularly to enhancing an LCD's perceptibility when in sunlight.

Background Art

Popularity of LCDs have imposed increased demands on their performance particularly when included in portable electronic products such as smart phones, personal digital assistants ("PDAs"), notebook computers ("notebook PCs"), tablet computers ("tablet PCs") and so forth. However, LCDs in such portable electronic devices must provide an image that is visible both indoors and outdoors, i.e. in the presence of sunlight. Typically, moving a portable electronic product into strong sunlight washes out the image on the display screen. The main reason that images on LCDs are difficult to view outdoors is that sunlight overpowers a backlight emitting light that passes through the LCD while sunlight reflects from the LCD screen. Presently, increasing backlight brightness is commonly used for improving LCDs visibility in glaring light. However, increasing a LCDs visibility in glaring light by increasing backlight brightness is disadvantageous because:

1. a brighter backlight increases a device's electrical power consumption;
2. increased power consumption accelerates the drain of the system battery; and
3. increased power consumption requires greater thermal dissipation or the LCD will likely overheat.

Historically, and particularly for LCD backlighting units ("BLUs") that includes a light pipe, BLUs usually operate as a fixed brightness light source at a constant maximum brightness. From a practical perspective, operating BLUs at a constant maximum brightness was unavoidable until LED-based BLUs began replacing cold cathode fluorescent ("CCFL") based BLUs. Using light emitting diodes ("LEDs") in a LCD's BLU is relatively recent. Beginning around 2008 LED BLUs began rapidly replacing CCFL illumination in LCD BLUs.

FIGS. 1-3 depict a typical commercially designed LCD BLU, identified by the general reference number (18), juxtaposed with a LCD glass panel (04). For purposes of the present description, the relevant components of the BLU (18) include LEDs (01) arranged in an approximately linear LED array (21) stationed in an edge-lit configuration with respect to a light pipe (03). Light emitted from the LEDs (01) enters an input edge (02) of the light pipe (03) which transforms the light into an approximately uniformly lit rectangle that back illuminates the LCD glass panel (04) producing a screen brightness B(0). A typical commercial LCD module includes other mechanical, electrical and optical components in addition to the BLU (18) that are irrelevant to this description and, for clarity, have been omitted from the drawings.

Drive electrical current supplied to LEDs (01) is largely limited by thermal dissipation of the lighting system design and by self-heating of LEDs semiconductor junction which is the principle source of heat generation within the BLU (18). The allowable operating electrical current flowing through LEDs (01) is governed far more significantly by these thermal considerations than a CCFL's operating electrical current. However, an LED (01) may be safely driven at a substantially higher electrical current than its normal continuous operating drive electrical current for short periods of time. The length of such periods depends on the effectiveness of the thermal design of the BLU (18) and the intrinsic thermal conductivity of the LED light source carrier package. Under appropriate circumstances, it is possible to advantageously exploit this fact to temporarily boost the light output of an LED BLU (18) by as much as 2-6 times or more above its continuous operating brightness.

United States Patent Application Publication no. 2012/0188481 A1 entitled "LCD Apparatus" discloses a LCD display apparatus adapted for use outdoors. The disclosed LCD display apparatus includes a pair of LCD modules arranged back to back so each LCD is viewable from one side of the LCD display apparatus. Each LCD module includes a LCD and its associated back panel that includes a backlight module. The LCD modules' back panels, which face each other, are spaced apart to establish a ventilation channel between the back panels. A set of fans located at one end of the ventilation channel blow air longitudinally past the back panels to remove heat generated in the backlight modules and other electronic circuits mounted thereon. A backlight controller responding to an ambient light sensor dynamically controls operation of the backlighting module so LCD backlighting responds to ambient lighting for maintaining a balance between sufficient image brightness, energy preservation and operating life of the LCD panel.

LEDs (01) are commonly known as current devices. They are best powered from a circuit that regulates their input current by carefully monitoring the LED drive current via an active feedback loop. Such a LED driver integrated circuit ("IC") chip continuously adjusts voltage supplied to the LEDs (01) to maintain a specified electrical current through the LEDs (01). While many such LED driver ICs are commercially available, two examples thereof are a LTC3783 PWM LED Driver and Boost, Flyback and SEPIC Controller made by Linear Technology Corporation 1630 McCarthy Boulevard, Milpitas, Calif., and a HV9912 Switch-mode LED Driver IC With High Current Accuracy and Hiccup Mode Protection made by Supertex, Inc. 1235 Bordeaux Drive, Sunnyvale, Calif.

Output to the LEDs (01) can be user modified from an appropriate input using either pulse width modulation (PWM) or direct control of the driver circuit DC output current. Most LED driver chips have inputs for this kind of control which, of course, can be done by some kind of manual input or automatically in response to an external command as from a microprocessor or other data processing device. These in turn can have various ambient sensing inputs such as thermal and optical sensors giving the system some amount of intelligent decision making ability. In any case, given the very fast response time of typical LEDs (01), it is possible to give a user the ability to rapidly adjust the BLU brightness.

BRIEF SUMMARY

An object of the present disclosure is to provide a better BLU (18) for viewing a LCD in bright sunlight.

Another object of the present invention is to slow the rate of temperature increase in the LEDs (01) by advantageously exploiting a phase transition occurring in a suitably selected Phase Change Material ("PCM").

Briefly, the present disclosure includes a method for operating BLU (18) that includes a LED array illumination source. Supplying an electrical current continuously to LEDs included in the LED array causes the LED array to emit illumination that passes through a LCD. The method includes a step of increasing for a brief period of time electrical current supplied to the LEDs.

During the brief period of time while the increased electrical current flows through the LEDs, the illumination passing through the LCD increases significantly thereby permitting improved viewing the LCD when in bright sunlight. The present disclosure differs from conventional LED BLU in that the BLU (18) is energized for a short interval of time so as to emit a significantly higher brightness than the LED BLU (18) emits during continuous operation at maximum brightness.

Advantages of the present disclosure for momentarily increasing electrical current flowing through LEDs (01) included in the BLU (18) beyond that normally flowing continuously through the LEDs (01) include:

1. reducing cost of a display system capable of such operation;
2. reducing overall electrical power consumed by the BLU (18) significantly thereby either:
   a. extending battery life; and/or
   b. allowing use of a smaller, lighter battery; and
3. reducing both the weight and size of a display system capable of such operation.

A preferred embodiment BLU (18) that operates in accordance with the present disclosure includes more LEDs (01) in the LED array than are included in a conventional LED array. Including more LEDs in the LED array provides two additional benefits for the end user.

1. When operating the BLU (18) continuously at a brightness typical of most commercially designed displays, a lower average LED drive current significantly increases:
   a. LED light generating efficiency; and
   b. correspondingly decreases electrical power consumed by the BLU (18) and heat produced thereby extending operating time for a battery energized device.
2. Decreasing per-LED power consumption and heat generation improves the operating life of the BLU (18) and reliability.

A second object of the present disclosure is to provide a means for extending the safe operating time of the BLU (18) under high thermal load by incorporating a planarized thermal ballast that is in thermal contact with the LEDs (05, 21) of the BLU (18). This preferred embodiment BLU (18) provides a means for extending the total duration of brightness boost by slowing down the rate of temperature rise caused by the increased power being supplied to the BLU (18).

These and other features, objects and advantages will be understood by and/or apparent to those of ordinary skill in the art from the following detailed description of the preferred embodiment as illustrated in the various drawing figures.

BRIEF DESCRIPTION OF THE DRAWINGS

FIG. 11 is a side elevational view of a PCM based, planarized, thermal ballast juxtaposed with a LED heat source in accordance with the present disclosure;

FIG. 12 is a perspective view of the PCM based, planarized, thermal ballast depicted in FIG. 11;

FIG. 13 is a partially sectioned perspective view depicting a pouch filled with a PCM that, in accordance with the present disclosure, is preferably included in the thermal ballast depicted in FIGS. 11 and 12;

FIG. 14 is a side elevational view of a finned heat sink that, similar to the thermal ballast depicted in FIGS. 11 and 12, includes a PCM;

FIG. 17 is a graph presenting results of calculated temperature of LEDs (01) versus time for:

Figure 17:
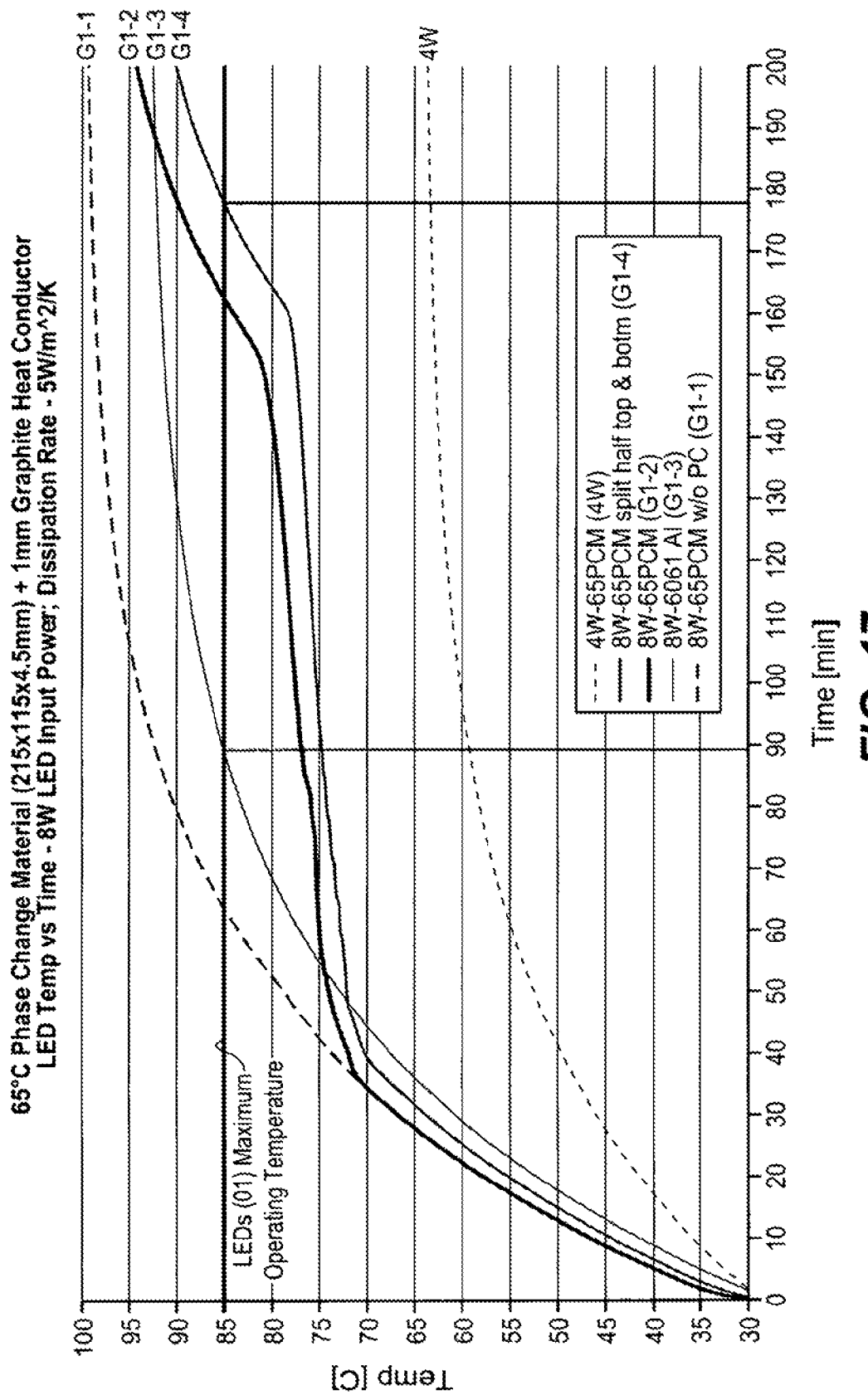
Figure 18:
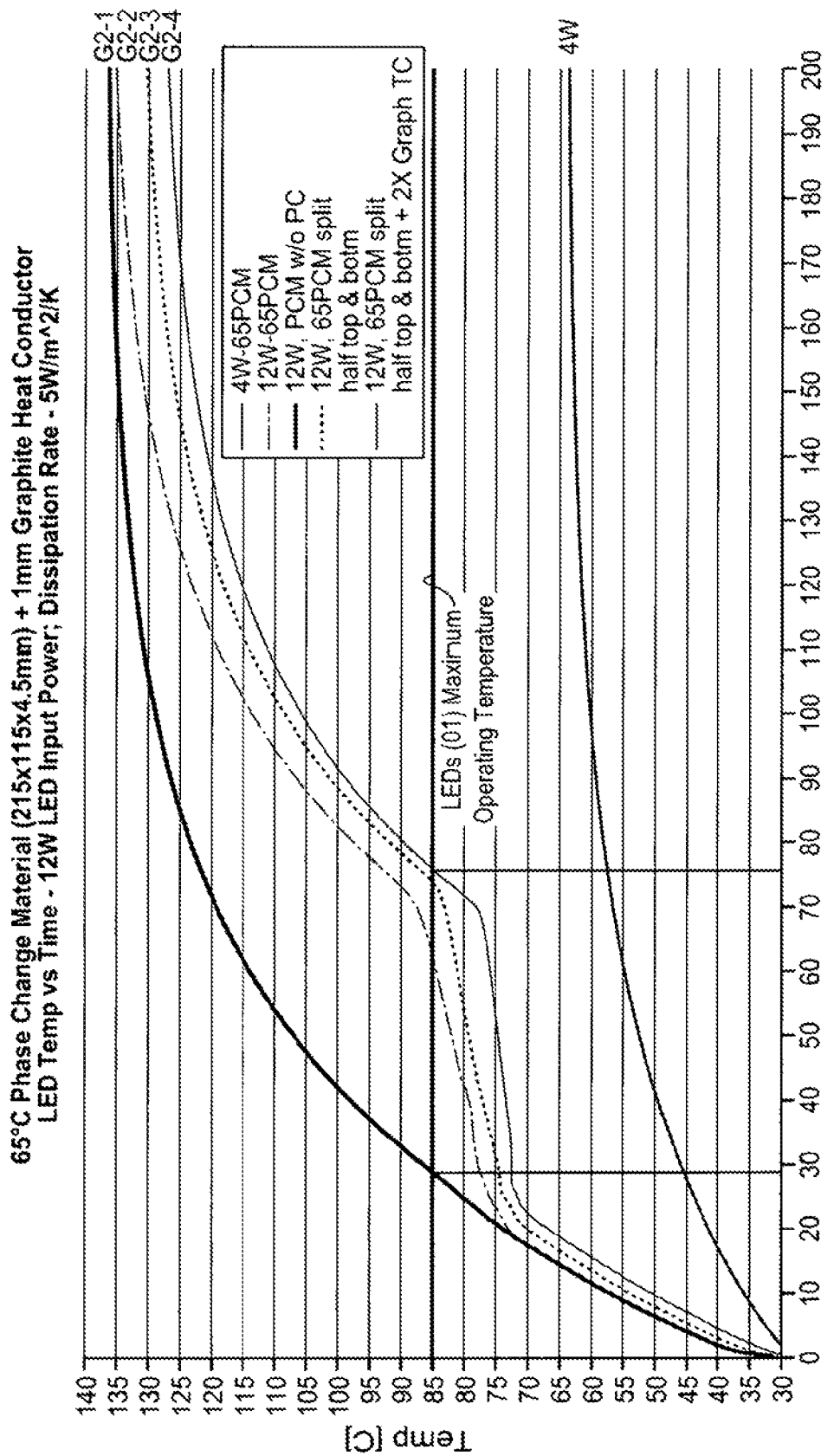
Figure 19:
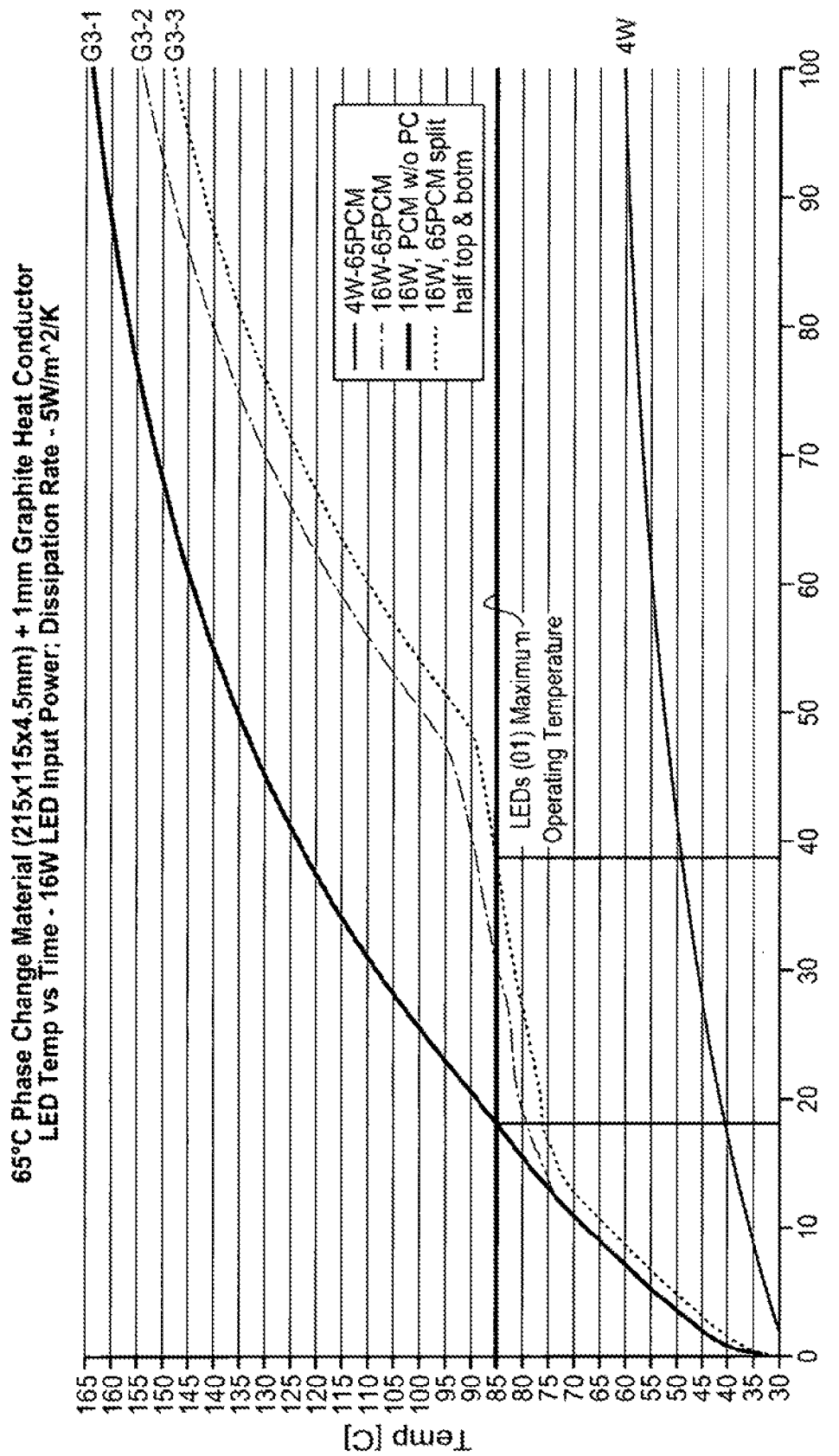

1. four different planarized thermal ballast configurations with each configuration being integrated with a PCs tablet's 10.4 inch LCD display wherein the display's LED array (05, 21) is driven with 8 watts of input power: and 2. one configuration wherein the LED array (05, 21) is driven with 4 of input power;

FIG. 18 is a graph, similar to the graph of FIG. 17, presenting results of calculated temperature of LEDs (01) versus time differing primarily from the graph of FIG. 17 in that the display's LED array (05, 21) is driven with 12 watts of input power; and FIG. 19 is a graph, similar to the graphs of FIGS. 17 and 18, presenting results of calculated temperature of LEDs (01) versus time differing primarily from the graphs of FIGS. 17 and 18 in that the display's LED array (05, 21) is driven with 16 watts of input power.

DETAILED DESCRIPTION

The present disclosure advantageously uses, for enhancing daylight visibility of a LCD, the ability to substantially increase, for short periods of time, electrical current flowing through LEDs (01) included in the BLU (18) above the normal continuous operating electrical current. During the short periods of time, electrical current supplied to the LEDs (01) of the BLU (18) increases to an amount above that supplied for continuous operation. Because of the widespread availability and use of low cost logic and data processing devices, there are numerous ways to configure an electronic system to accomplish the feedback and control functions described in this disclosure. This would be readily apparent to those skilled in the art. However, the functional elements described herein will detail the basic requirements. A BLU brightness control (22) in accordance with the present disclosure, depicted in FIGS. 9 and 10, permits a user to rapidly adjust the root mean square electrical current supplied to LEDs (01) or the BLU (18). But the relevant logic device prevents the user from re-increasing the electrical current too frequently so increased heat generated in the LEDs (01) can be adequately dissipated thereby avoiding LED damage.

As with most electronic components, typical engineering design practice sets LED backlight maximum drive current below the absolute maximum continuous drive operating current specification for a particular LED (01). However, in a BLU (18) operated in accordance with the present disclosure, the thermal mass of the LEDs (01) plus that of an associated heat sinking planarized thermal ballast (10) and dissipation components allows significantly increasing electrical current flowing through the LEDs (01) so long as the increase in electrical current is kept relatively short in duration, for example 15 seconds.

Figure 1:
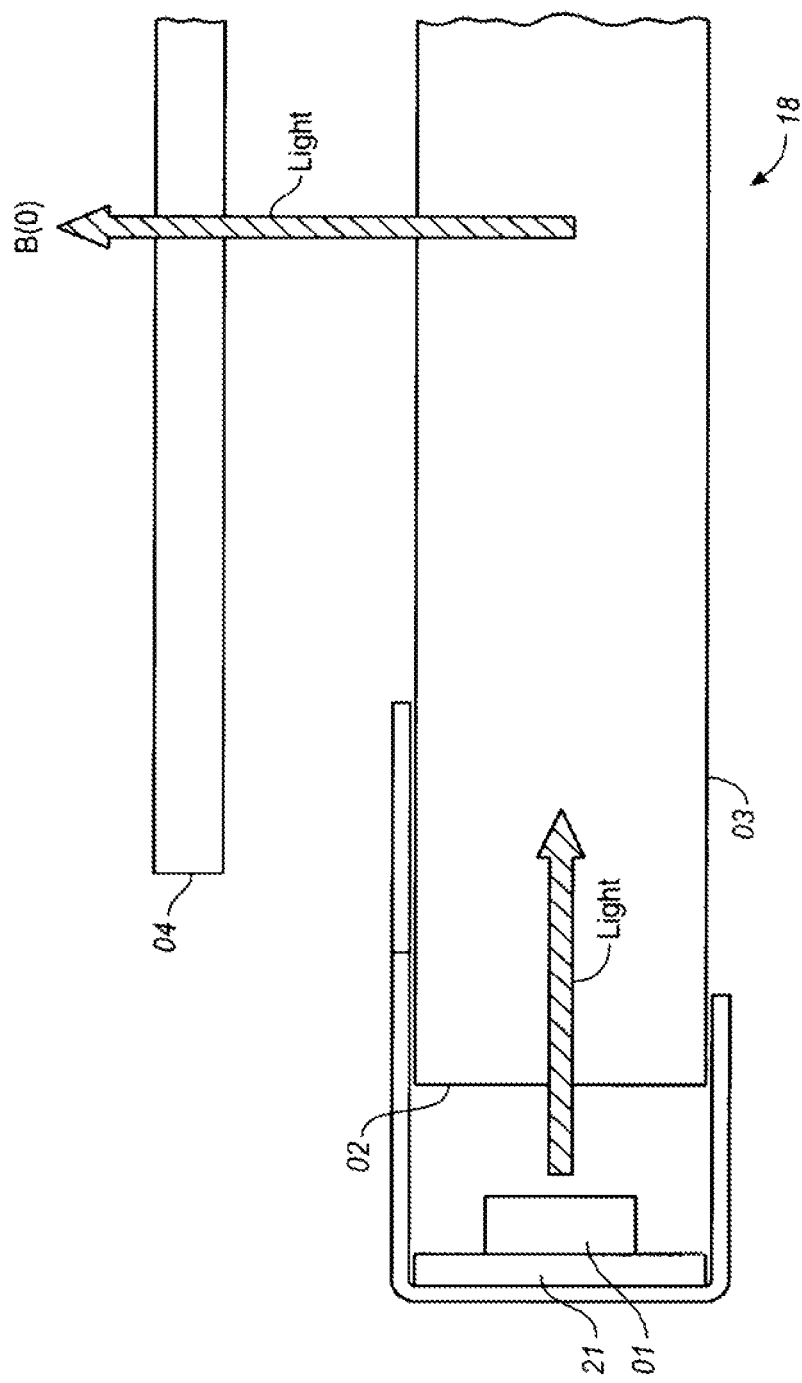
FIG. 1 is a partial cross-sectional elevational view of a typical commercial LCD BLU (18) depicting LEDs of a LED array and of a light pipe for projecting illumination through a LCD.
Figure 3:
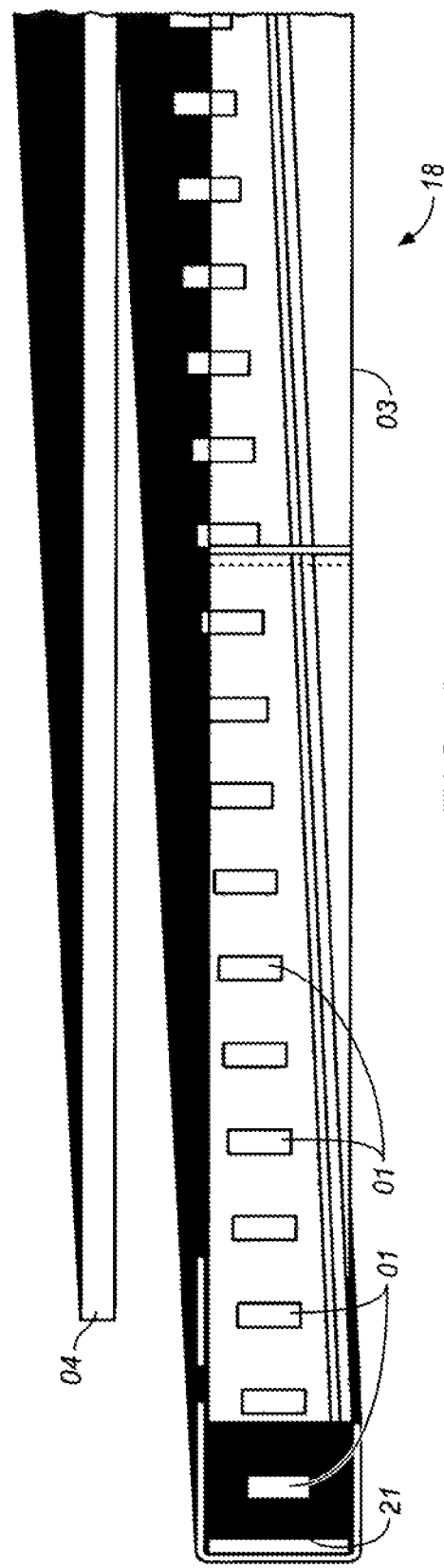
FIG. 3 is a partial perspective view of a portion of a typical commercial LCD BLU (18) depicting LEDs mounted of the LED array (21) and the light pipe for projecting illumination through the LCD.
Figure 4:
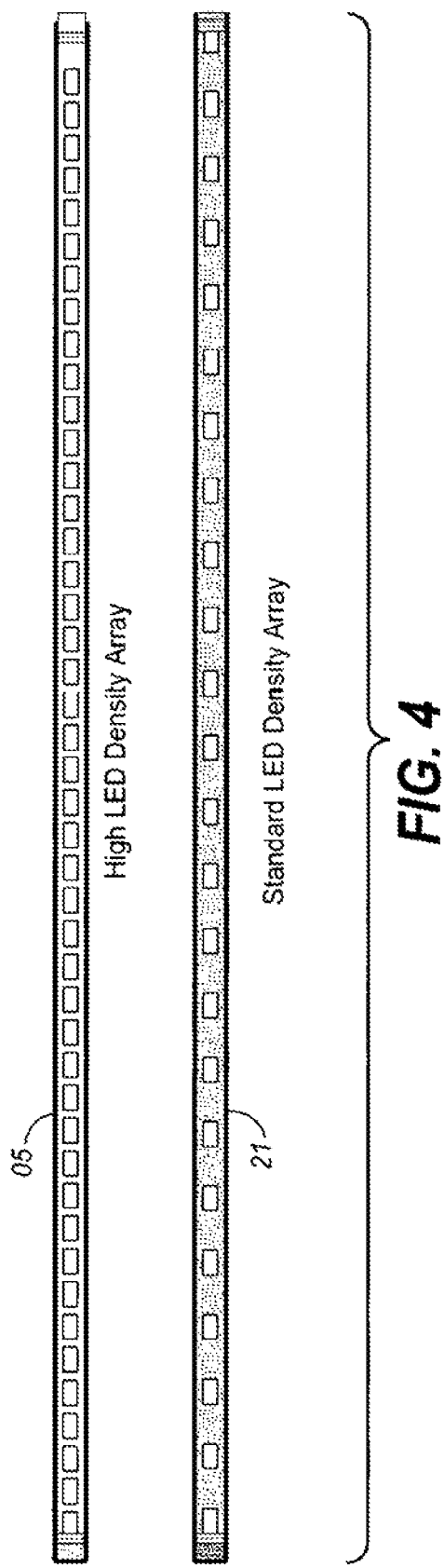
FIG. 4 is an elevational view comparing a density of LEDs of the LED array (21) included in a typical commercial LCD BLU (18) with a greater density of LEDs of a LED array in accordance with a preferred embodiment BLU (18) of the present disclosure.

FIG. 4 illustrates a preferred embodiment LED array (05) particularly adapted for operation in accordance with the present disclosure. FIG. 4 graphically depicts a difference in LED density between the standard LED array (21) and a preferred embodiment LED array (05). Consequently, the LED array (05) includes considerably more LEDs (01) than a typical LED array (21) depicted in FIGS. 1-3. Because the LED array (05) has a higher density of LEDs (01) than the standard LED array (21), the preferred embodiment LED array (05):

1. produces significantly more light than LED array (21) when the same amount of electrical current flows through the array of LEDs (01); or 2. alternatively produces the same amount of light for a lesser amount of electrical current flowing through each LED (01) included in the LED array (05).

Figure 2:
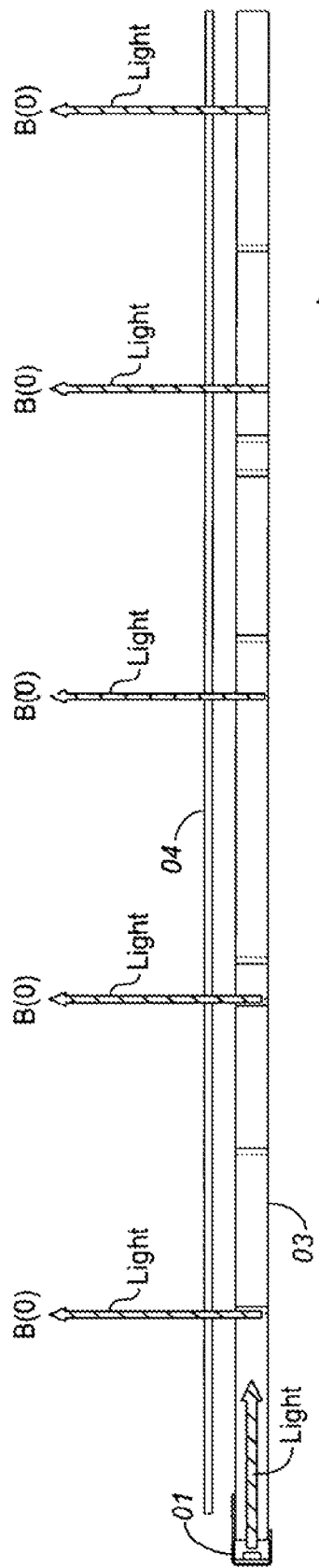
FIG. 2 is a cross-sectional elevational view of a typical commercial LCD BLU (18) depicting LEDs of the LED (21) array and of the entire light for pipe projecting illumination through the LCD.
Figure 5:
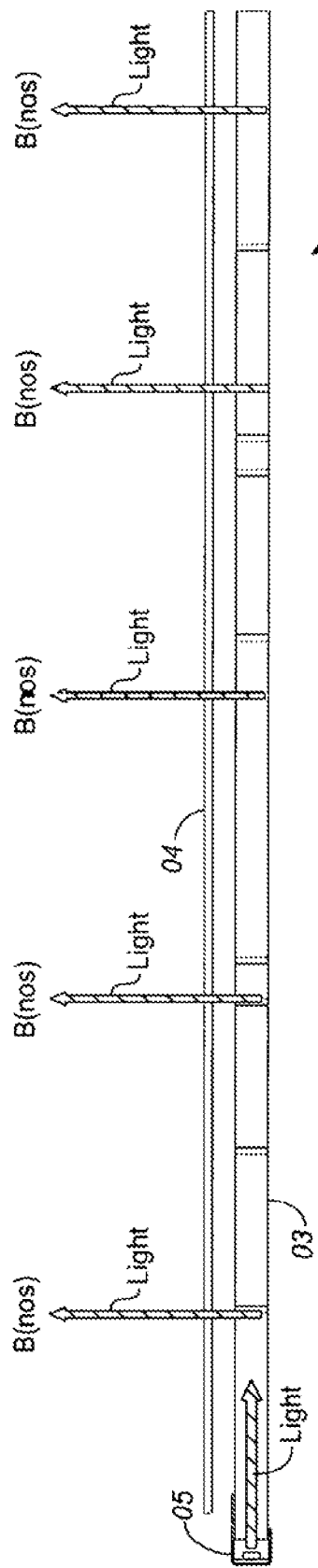
FIG. 5 is a cross-sectional elevational view of a LCD BLU (18) in accordance with the present disclosure depicting LEDs of the LED array depicted in FIG. 4 and of the entire light pipe for projecting illumination through the LCD.
Figure 6:
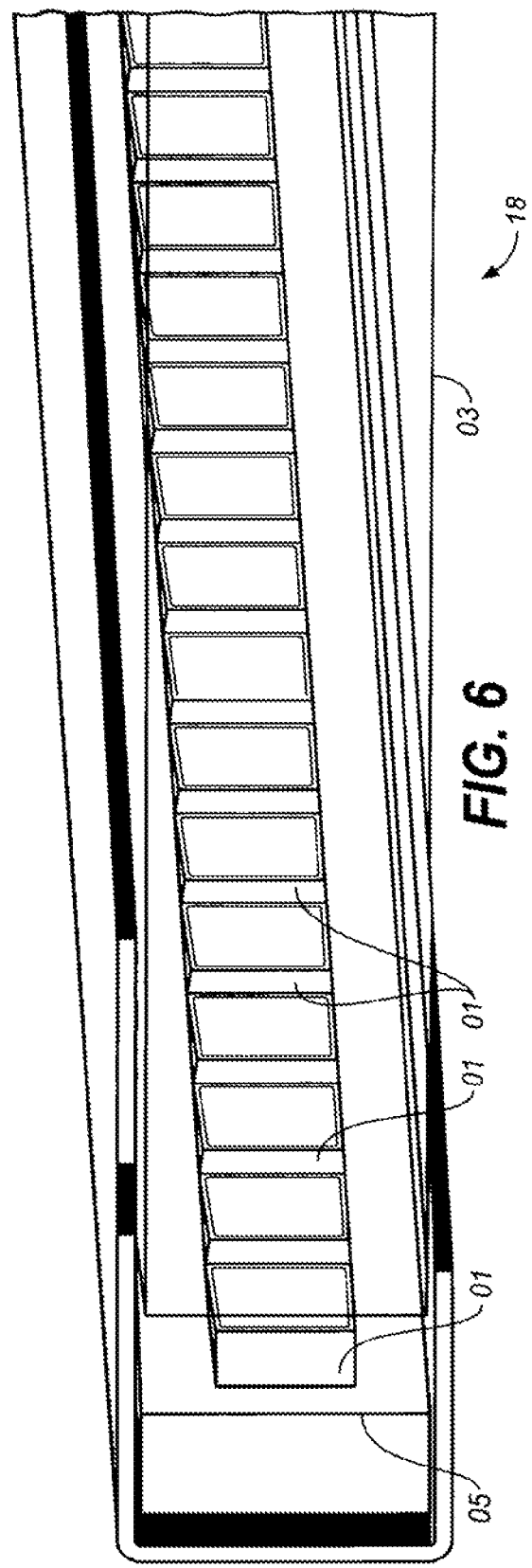
FIG. 6 is a partial perspective view of a portion of the LCD BLU (18) in accordance with the present disclosure's preferred embodiment depicting LEDs of the LED array shown in FIG. 4 with the greater density LEDs mounted thereon for emitting light into the BLU's light pipe.

FIGS. 5 and 6 illustrate a BLU (18) that includes the LED array (05) depictions that respectively correspond to FIGS. 2's and 3's drawings. Without damaging the LEDs (01), a much larger total electrical current can flow through LEDs (01) of the LED array (05) than can flow through the conventional LED array (21). This larger total current flowing through LEDs (01) of the LED array (05) correspondingly increases screen brightness B(nos) indicated by arrows in FIG. 5. The increased screen brightness B(nos) resulting from light emitted from the LED array (05) that passes through the LCD glass panel (04) depicted in FIG. 5 typically ranges between one and one-quarter (1.25) to six (6) times the continuous screen brightness B(0) of light passing through the LCD glass panel (04) for the conventional BLU (18) depicted in FIGS. 1-3.

Figure 7:
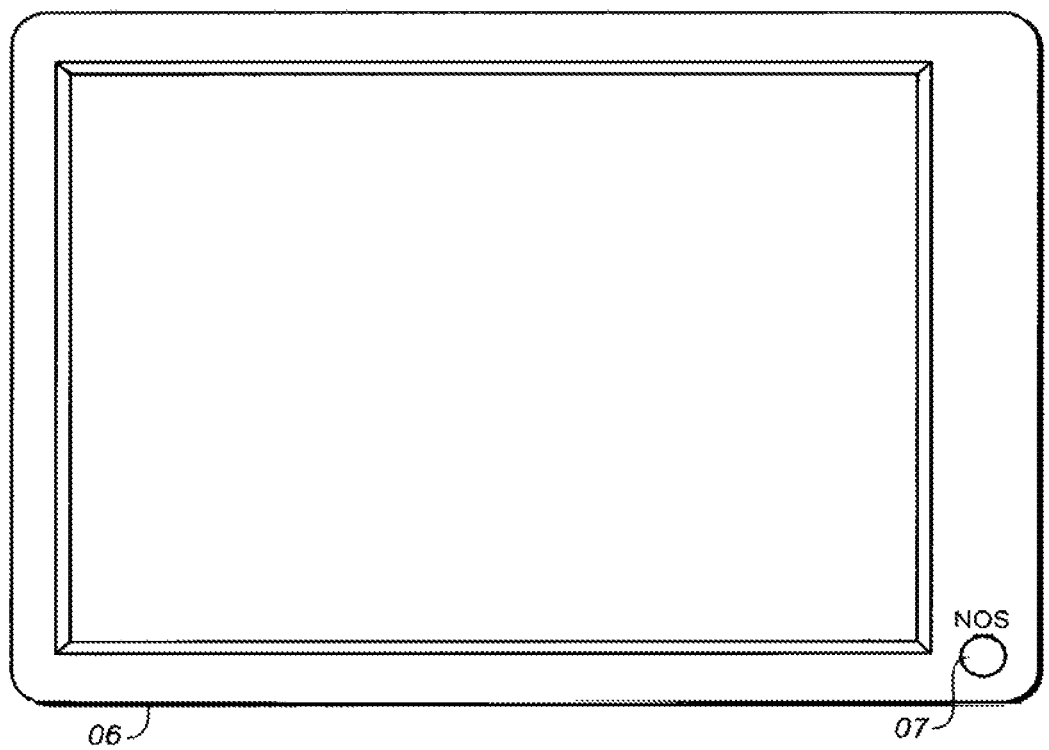
FIG. 7 is a plan view illustrating a portable LCD tablet device that includes a BLU (18) in accordance with the present disclosure having a button thereon that when depressed causes the BLU (18) to temporarily increase illumination projected from the BLU (18) through the LCD.

FIG. 7 depicts an exemplary high brightness portable tablet (06) which includes a BLU (18) in accordance with the present disclosure. The tablet (06) includes a NOS button (07) on the front thereof. To increase the brightness of an image appearing on the tablet (06) a user presses the NOS button (07). Specific details of how much the brightness increases and for how long are controlled by parameters that can either be preset by a manufacturer of the tablet (06) or, programmed by a user of the tablet (06).

Figure 8:
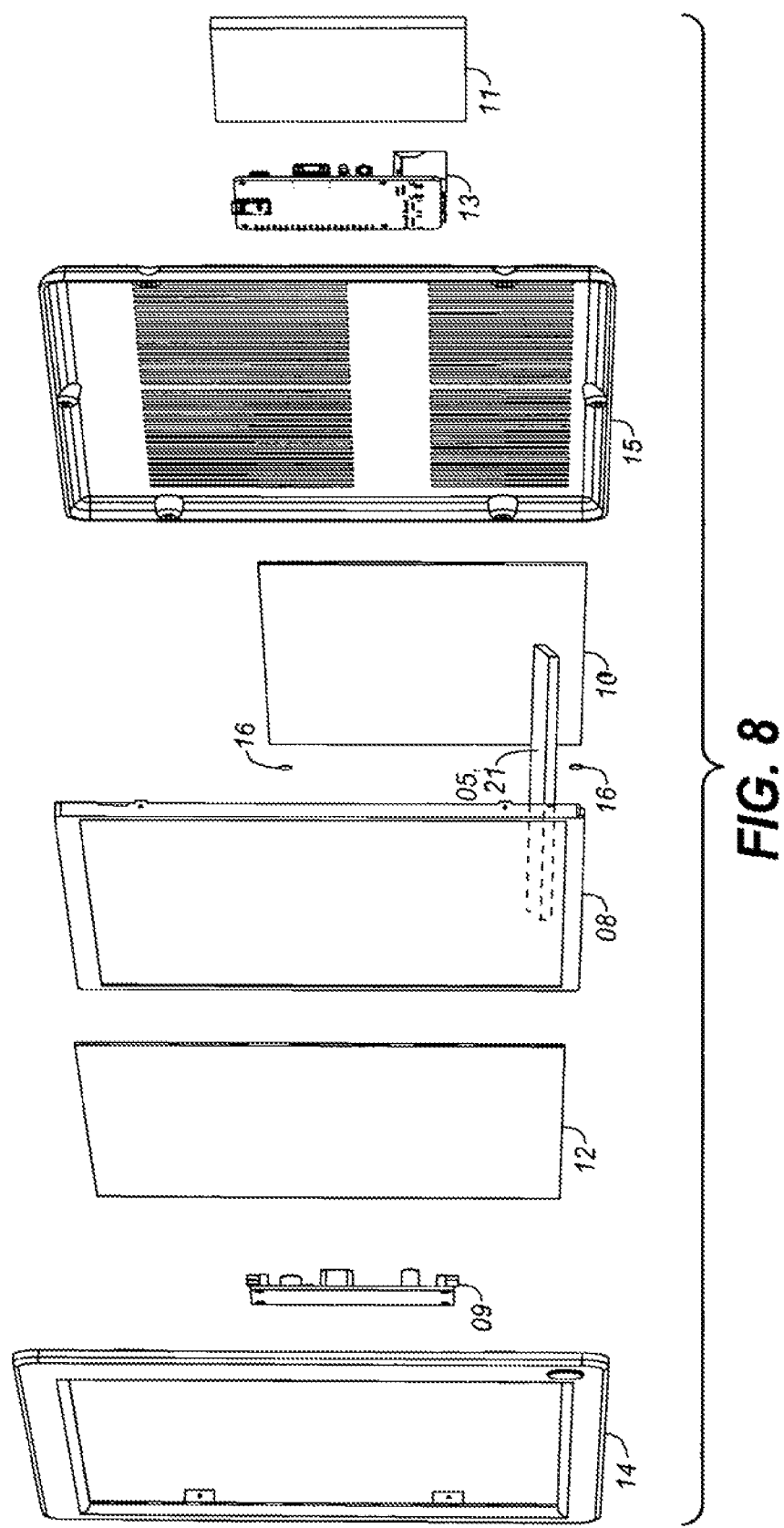
FIG. 8 is an exploded perspective view of the portable tablet device depicted in FIG. 7 having a BLU (18) in accordance with the present disclosure.

The exploded perspective view of FIG. 8 illustrates various components of the exemplary high brightness tablet (06) that is adapted for operating in accordance with the present disclosure. Typically, the LCD module (08) includes the LCD glass panel (04), LCD drive electronics not separately depicted in any of the FIGs., a frame and related mechanical mounting means. A BLU (18) that includes the LED array (05) may include one or more thermal sensors (16) for monitoring temperature of the BLU (18). The high brightness tablet (06) includes a LED driver (09) that is capable of supplying sufficient electrical current both:

1. for continuous operation of the LED array (05) or alternatively the standard density LED array (21); and 2. for increasing an image's brightness when a user presses the NOS button (07).

The LED driver (09) may also provide all ancillary feedback and control functions required for operating the BLU (18) in accordance with the present disclosure. Alternatively, such functions may reside in other components of the high brightness tablet (06).

The optional pair of thermal sensors (16) that may be included in the portable tablet (06) preferably locates one thermal sensors (16) adjacent to the middle of the LED array (05, 21), and the other thermal sensor (16) preferably adjacent to the middle of the thermal ballast (10) at an end thereof that is furthest from the LED array (05, 21). If the BLU (18) includes a thermal sensor (16) depicted in FIGS. 8-10 which responds to the temperature of the BLU (18), this provides an electrical signal to the data processing system ("DPS") (13) which then determines operating parameters that prevent the brightness increase from damaging the LEDs (01) included in the LED array (05, 21).

Also illustrated in FIG. 8 and included in the high brightness tablet (06) is a heat conducting, spreading and temporary storage thermal ballast (10) typically made from graphite, aluminum or copper. Alternatively, the thermal ballast (10) could also be a laminate combining high thermal mass materials and high thermal conduction materials such as graphite, aluminum or copper respectively.

One end of the thermal ballast (10) is juxtaposed with the LED array (05) which in the illustration of FIG. 8 is located inside the LCD module (08) horizontally at the bottom thereof. The term "thermally coupled" means that the thermal ballast (10) is mechanically affixed adjacent to or in very near proximity to the source or sources of heat produced by the LEDs (01) such that there exists a relatively low thermal resistance heat path from the LEDs (01) into the thermal ballast (10). The thermal ballast (10) conducts excess heat generated by the LED array (05) away from its LEDs (01), most importantly during intervals in which an image's brightness is being increased. The thermal ballast (10) temporarily stores heat produced by the LED array (05) while an image's brightness is being increased. In essence, this arrangement reduces the rate at which the temperature of the LEDs (01) increases while an image's brightness is being increased. The amount of thermal mass provided by the thermal ballast (10) together with the amount of added power consumed by the LED array (05) correlates directly with how long the high brightness tablet (06) may present a brightened image.

Figure 9:
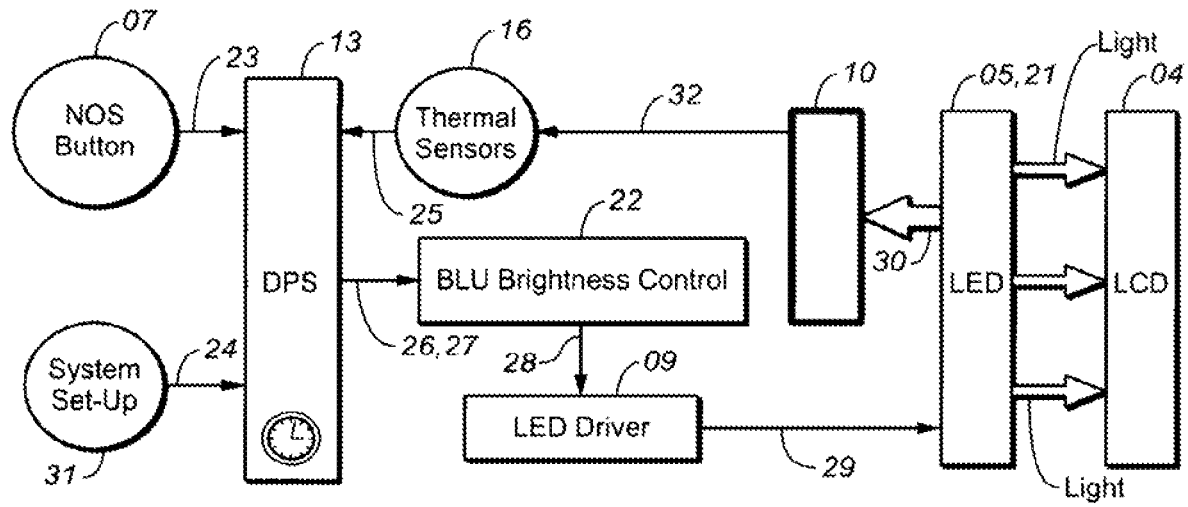
FIG. 9 is a block diagram of a LCD system in accordance with the present disclosure.

FIG. 9 is a block diagram of a display system in accordance with the present disclosure. The block diagram illustrates the preferred embodiments in the present disclosure which include a planarized thermal ballast (10) and one or more thermal sensors (16) for monitoring the temperature of the planarized thermal ballast (10). Both a boost request, that a user may present by pressing the NOS button (07), and a system set-up input (31), appear in the FIG. 9 block diagram. An arrow (23) in FIG. 9 indicates transmission of the boost request to the DPS (13), and an arrow (24) in FIG. 9 indicates transmission of system setup information to the DPS (13). The DPS (13) illustrated in FIG. 9 includes a clock icon to indicate that lacking either the thermal sensors (16) or planarized thermal ballast (10), the DPS (13) is capable of determining if a brightness increase is still possible based solely upon timing considerations, as explained in the next paragraph.

Figure 10:
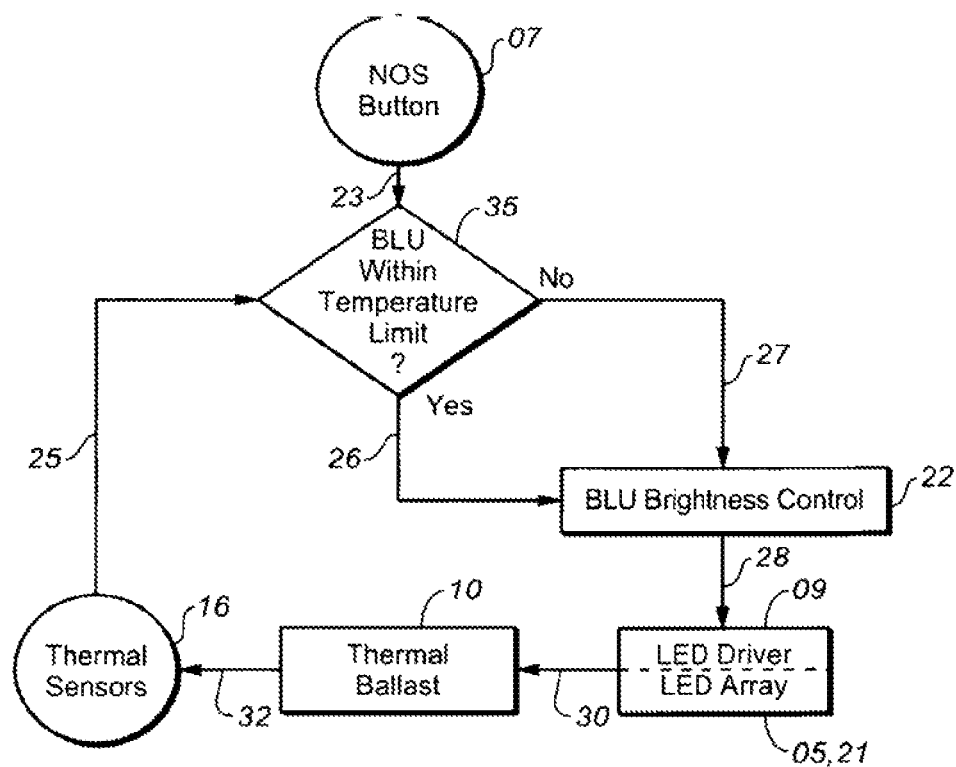
FIG. 10 is a flowchart of a LCD system in accordance with the present disclosure.

FIG. 10 illustrates a functional flowchart of feedback and control functions for controlling brightness increase(s) by the user in accordance with the present disclosure. Starting from a brightness boost request that a user may present by pressing the NOS button (07), a signal is transmitted to decision block (35) as indicated by an arrow (23). The DPS (13) in performing decision block (35) determines if it is safe to allow the brightness increase request. This is minimally determined by the BLU's thermal design and the user's amortized cumulative brightness increase request(s). If a BLU-associated thermal sensor (16) is included in the system design, then as indicated by an arrow (25) in FIGS. 9 and 10, the sensor (16) supplies accurate real time data for use by the DPS (13) in analyzing the user request. Otherwise, the DPS (13) must rely on embedded designer-programmed a-priori knowledge of the un-boosted BLU power consumption obtained during product design and testing. In this case, the designer(s) must rely on timing and experimentally measured heat dissipation characteristics of the system to appropriately program the response of the DPS (13) to brightness boost requests.

In FIG. 10, an arrow (26) indicates transmission of a control signal from the decision block (35) to the BLU brightness control (22) for permitting a brightness increase by the LED array (05, 21). Conversely, an arrow (27) in FIG. 10 indicates transmission of a control signal from the decision block (35) to the BLU brightness control (22) for maintaining the continuous brightness setting of the LED array (05, 21), i.e. for blocking a brightness increase by the LED array (05, 21).

In both FIGS. 9 and 10, an arrow (28) depicts transmission of a signal from the BLU brightness control (22) to the LED driver (09) for controlling the brightness of the LED array (05, 21). An arrow (29) in FIG. 9 indicates transmission of electrical current from the LED driver (09) to the high density LED array (05) or alternatively the standard density LED array (21). Arrows (30) and (32), respectively appearing both in FIGS. 9 and 10, indicate transmission of heat from the LED array (05, 21) via the thermal ballast (10) to the thermal sensors (16).

As illustrated in FIG. 8, the exemplary high brightness tablet (06) includes a front (14) and rear (15) of a case that enclose other components included therein. While not required for practicing the present disclosure, as illustrated in FIG. 8 the exemplary high brightness tablet (06) will generally include a lithium ion battery (11), a touch panel (12) and a DPS (13) such as an ARM-based single board computer. The DPS (13), different types of which are widely available, will typically include a video/graphics controller to interface with and drive the LCD module (08) as well as both a USB port and a HDMI port, that are not separately illustrated in FIG. 8. If the LED driver (09) of the BLU (18) were to omit feedback and control functions, alternatively such functions could be included in firmware executed by the DPS (13). The touch panel (12) requires a controller which may or may not be integrated into the DPS (13) and/or the LED driver (09). The DPS (13) may also include a Wi-Fi transceiver to allow the tablet (06) to video link wirelessly with a video camera such as is frequently included in a smart phone, tablet or any other appropriately capable mobile computing platform, and/or telemetry received from a drone or drone controller or any other remotely controlled system.

Temporarily boosting brightness helps applications such as commercial drone controllers which are most often operated outdoors in daylight where the sun can easily wash out the drone camera image and/or telemetry feeds appearing on the pilot's video monitor. For example, a drone's operator who is outdoors in daylight relies to some degree on the drone's video camera and telemetry data to control the drone's flight and operation. However, in such an environment viewing a video monitor can become difficult because of ambient reflections and sunlight falling on the front (14) of the display screen. When the drone's operator becomes aware that the drone is entering a critical part of its flight, the operator wants to ensure being able to clearly see everything on the LCD. Therefore, when such an event occurs the drone's operator can, in accordance with the present disclosure, initiate a period of increased screen brightness B(nos) having a preselected duration, e.g. 10 seconds.

Since most flight control systems for commercial drones are battery operated, if the BLU (18) operated continuously at the increased screen brightness B(nos), the flight control battery would discharge much more rapidly. However, in accordance with the present disclosure a drone's operator can view the drone's video and/or telemetry feeds under all ambient conditions without increasing the flight control's weight and/or while avoiding significant compromise of the flight control's battery life. As is readily apparent, any outdoor daylight application of an LCD display could advantageously operate in accordance with the present disclosure.

A possibility exists that one could simply increase the drive current provided to a conventionally designed LED illuminator array (21), as are typically found in consumer grade electronic devices, to boost the screen brightness B(nos). But such operation of a conventional BLU (18) has the disadvantages of:

1. significantly shortening the operating life of the BLU (18);
2. decreasing the reliability of the LCD module (08); and
3. shortening the available run time of a system's battery.

By way of comparative example, the BLU (18) in a 12.1" XGA display module is designed to achieve a maximum continuous screen brightness B(0) of 500 nits (i.e., cd/m$^2$). The LED strip of the LED array (21) in such a BLU (18) is designed to dissipate approximately 5 W continuously to produce the preceding continuous screen brightness B(0). In accordance with the present disclosure, the LED array (21) is replaced by the LED array (05) that is capable of emitting substantially more light without exceeding the maximum allowable current for its LEDs (01). For example, if the LED array (05) were to safely operate at approximately 20 W, the resulting boosted screen brightness B(nos) could be approximately 3000 nits. Lacking the high LED density LED array (05), it is unlikely that a conventional LED array (21) could withstand dissipating such a power increase without failing or melting something inside the tablet (06). However, a conventional consumer grade electronic device might survive without damage a more modest temporary 1.25 to 2.0 brightness increase, i.e 625 nits to 1000 nits.

However, such increased power dissipation could not be sustained indefinitely without modifying cooling of the LED array (21). A BLU (18) in accordance with the present disclosure allows the LCD module (08) to operate for at least 15 seconds without exceeding the BLU's temperature or current limits. The combination of the DPS (13), the BLU brightness control (22) and the LED driver (09) permits a user to initiate periods of increased screen brightness B(nos) either using the NOS button (07) or via a soft button control or other convenient means for temporarily increasing electrical power supplied to the LEDs (01) as much as 3 times or more for a period of 2-20 seconds or more before returning to its preselected continuous brightness setting.

Consider the BLU (18) in a conventional 12.1" XGA display module being driven at its normal, continuous maximum brightness, e.g. 5 W, and the equilibrium temperature directly adjacent to the LED array (21) is 35° C. Also, assume that the maximum manufacturer-rated operating temperature for this display module is 70° C. Further assume that increased screen brightness B(nos) were enabled for a preselected duration of 15 seconds. Hypothetically, based upon operational testing while designing the conventional 12.1" XGA display module it were known that a 15 second 15 W input power increase to the LED array (21) causes a temperature increase of 15° C. Since a temperature of 50° C. is still well within the normal operating parameters both for the LCD glass panel (04) and for the BLU (18), then the DPS (13) would permit such an increase in screen brightness to B(nos).

After such a 15 second period of increased screen brightness B(nos) when the BLU (18) returns to its original power and brightness level, assume that a user were to immediately start another period of increased screen brightness B(nos). Since insufficient time has elapsed for heating due to the increased screen brightness B(nos) to have fully dissipated, the initial starting temperature of the LCD glass panel (04) and of the BLU (18) for the subsequent 15 second period of increased screen brightness B(nos) is approximately 50° C. After a second 15 seconds of 15 W power input to the LED array (21) its temperature would be approximately 65° C., (actually somewhat less but this is not important to the current example). Again, this is within the normal operating range of this display module so the DPS (13) would permit such a second increase in screen brightness to B(nos).

Again, immediately after the second increase in screen brightness B(nos) a user were to immediately start a third period of increased screen brightness B(nos). The projected temperature of the LCD glass panel (04) and of the BLU (18) at the end of the period will be somewhat less than 80° C. which exceeds the temperature rating for the conventional 12.1" XGA display module. Therefore, the DPS (13) would not permit the third successive period of increased screen brightness B(nos) until the temperature of the LCD glass panel (04) and of the BLU (18) has decreased to approximately 55° C. at which time another period of increased screen brightness B(nos) could be safely permitted.

As is readily apparent, including the thermal sensors (16) in the LCD module (08) assists in preventing the LEDs (01) from being damaged by a period of increased screen brightness B(nos). Alternatively, if the DPS (13) records how much the power has been increased to the LEDs (01) and for what duration and how much time has elapsed since the most recent period of increased screen brightness B(nos), it is also possible to prevent the LEDs (01) from being damaged by a period of increased screen brightness B(nos).

FIGS. 11 and 12 illustrate perhaps the simplest structure for a highly effective thermal ballast (10). FIGS. 11 and 12 depict a preferred embodiment of FIG. 8's thermal ballast (10) that includes:
1. a highly thermally conductive planar layer (42), typically 0.1 to 3.0 mm thick, made from, for example, graphite, aluminum or copper on one side of which is laminated;
2. a relatively thin thermal storage layer (44), for example 0.5 to 10 mm thick, that is preferably filled with a PCM (46).

While the thermal storage layer (44) is preferably filled with the PCM (46), a still useful but less effective thermal ballast (10) can be assembled using a thermal storage layer (44) made solely from a solid piece of material advantageously having a high specific heat, e.g. aluminum.

Within the assembled tablet (06), juxtaposing one end of the highly thermally conductive layer (42) with the LED array (05, 21) establishes a thermal connection there between. Extending one end of the highly thermally conductive layer (42) out beyond an edge of the thermal storage layer (44) can facilitate this thermal coupling between the highly thermally conductive layer (42) and the LED array (05, 21).

Since many PCMs exhibit comparatively poor thermal conductivity, using a graphite highly thermally conductive layer (42) is highly advantageous. For example, the literature value for the thermal conductivity of Glauber's salt is approximately 0.6 W/(m·K) whereas the thermal conductivity of many commercially available graphite sheet materials is 400 W/(m·K) or more. Thus, the planarized thermal ballast (10) that includes PCM(s) (46), such as that depicted in FIGS. 11 and 12, both efficiently spreads heat away from the LED array (05, 21) via the graphite highly thermally conductive layer (42) while concurrently providing substantial thermal energy storage in the thermal storage layer or layers (44).

If the highly thermally conductive planar layer (42) is made from graphite it may include a thin (e.g. approximately 0.01 to 0.03 mm thick), laminated polymeric isolation layer on one or both sides. To facilitate assembling the layered structure of thermal ballast (10) depicted in FIGS. 11 and 12, a thin adhesive coating may be applied either to the highly thermally conductive planar layer (42) or to the thermal storage layer (44) for bonding them together into an integral unit.

As would be apparent to those skilled in the art, there exist many possible alternative specific lamellar structures that include highly thermally conductive planar layer or layers (42) and thermal storage layer or layers (44) that implement the general concept of thermal ballast (10) depicted in FIGS. 11 and 12. For example, the thermal storage layer or layers

(44) can be formed by a plate of porous metal into which pores PCM (46) has been infused. One example of a suitable porous metal for forming part of the thermal storage layer or layers (44) is porous aluminum marketed by Exxentis Ltd. located in Switzerland. Exxentis Ltd.'s products include seven (7) different types of porous aluminum material each having a different pore size. The pore size selected for porous aluminum included in the thermal storage layer (44) must be smaller than the thickness thereof. Note that other porous materials such as a porous stainless steel, bronze, nickel, nickel based alloy, titanium or copper material could be used for the thermal storage layer (44) instead of porous aluminum, If a porous metal plate were to also include an integrally formed layer of solid material that is 1.0 mm to 10.0 mm thick, the solid layer could advantageously function as the highly thermally conductive planar layer (42) thereby providing a one-piece thermal ballast (10).

Advantageously, as illustrated in FIG. 13 the PCM (46) can be packaged in a thin inert casing or pouch (48) such as is commonly used for lithium ion batteries. For example, pouches (48) having a wall thicknesses of 71 to 156 μm are commercially available, and can be ordered to have a depth perpendicular to the highly thermally conductive layer (42) of 4.5 mm to 8.0 mm. Multi-layer pouches (48) include a nylon layer, an AL foil layer, and a cast polypropylene layer. Using the flexible pouch (48) for the thermal storage layer (44):

1. provides a good vapor barrier;
2. exhibits excellent pouch sealing;
3. provides good chemical resistance; and
4. can stretch and give thereby accommodating thermal expansion and contraction of the PCM (46).

Consequently, even though the PCM (46) changes from a solid to a liquid when heated above its transition temperature, the sealed pouch (48) will hold the PCM (46) in place without leakage.

The PCM (46) enclosed within the thermal storage layer (44) might, for example, be Glauber's salt, the decahydrate of sodium sulfate $Na_2SO_4:10H_2O$ which is also identified by the names sal mirabilis (decahydrate), mirabilite (decahydrate) and disodium sulfate decahydrate. For use in the thermal storage layer (44), Glauber's salt advantageously undergoes a phase change at approximately 90° F., i.e. well within the 85° C. maximum operating temperature of LEDs (01) included in the LED arrays (05, 21). In addition to Glauber's salt, other phase change materials, both organic and inorganic, are known each with its unique phase transition temperature. For example an organic mixture of materials known as OM65P, made by RGEES, LLC, 1465 Sand Hill Road, Candler, N.C., changes phase at 149° F., also well within the 85° C. maximum operating temperature of LEDs (01).

Filling the thermal storage layer (44) with a PCM (46) significantly increases the heat storage capacity of the planar thermal ballast (10) if the temperature rises above the PCM's transition temperature. Strictly by way of example to illustrate the relative increase in thermal storage capacity possible by using a PCM (46), if the thermal storage material were ice (an unlikely choice), below its freezing point this material would absorb about 0.5 cal/g/° C. Therefore, for every 0.5 calorie of heat absorbed by one gram of ice its temperature increases by one degree Celsius. However, at ice's melting point of 0° C., the ice absorbs about 80 cal/g/° C., a 160× increase in heat absorption capacity in comparison with solid ice.

As would be apparent to those skilled in the art, a planarized thermal ballast (10) having multiple thermal storage layers (44), that in one embodiment respectively contact opposite sides of the highly thermally conductive layer (42), can be fabricated with each individual thermal storage layer (44) enclosing a PCM (46) having a different transition temperature. Such a multi-layered planarized thermal ballast (10) extends the temperature range over which the a planarized thermal ballast (10) provides enhanced thermal energy storage capacity for the LEDs (01) included in the LED array (05, 21). Also by way of example, the thermal ballast (10) could include several highly thermally conductive layers (42) each of which is laminated on one or both sides to thermal storage layers (44). For practical reasons assuming that the PCMs (46) are not otherwise microencapsulated, it may be advantageous to enclose each PCM (46) having a different transition temperature within an individual thermal storage layer (44) rather than mixing the PCMs (46) together inside a single thermal storage layer (44).

Figure 15:
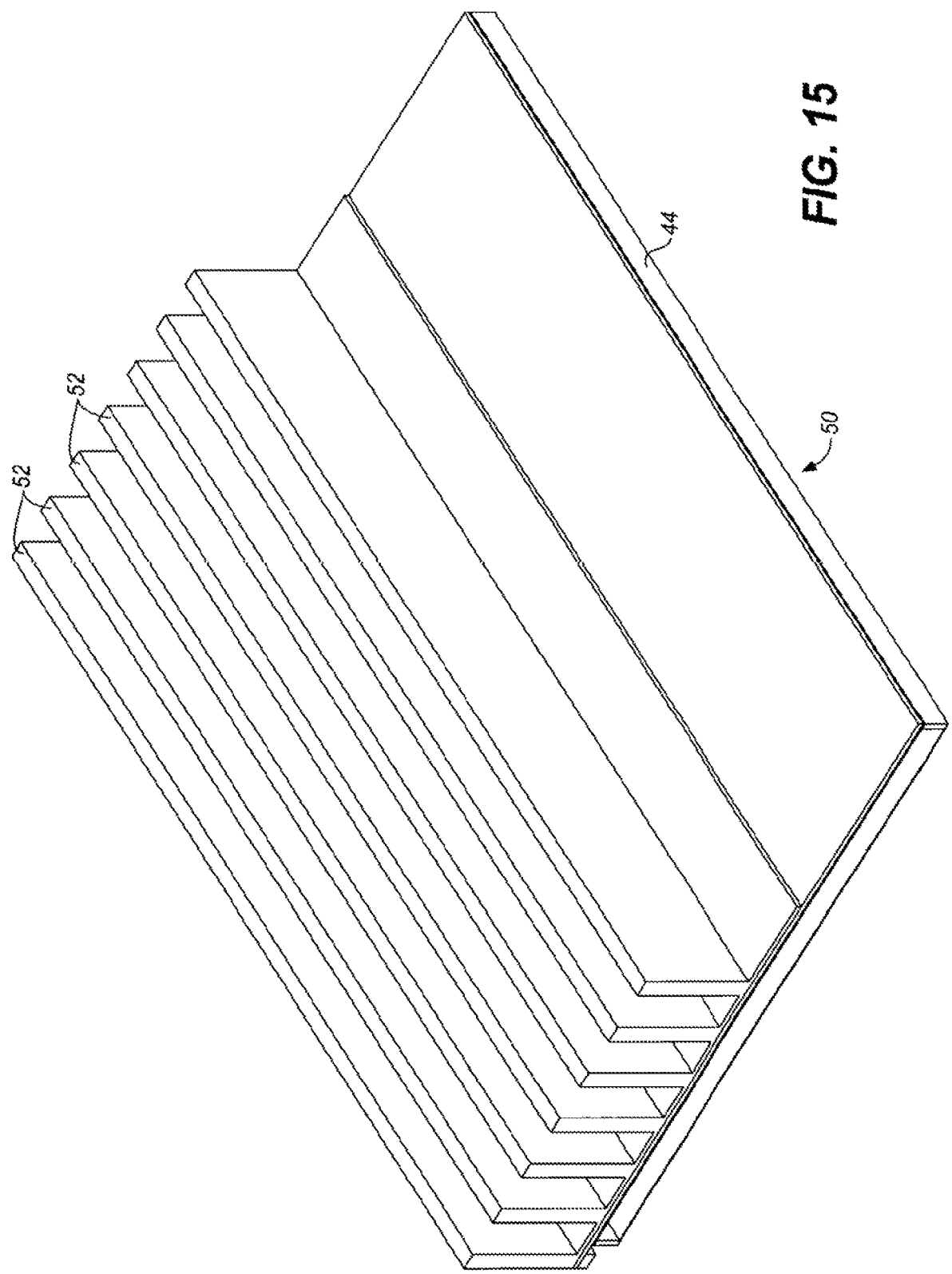
FIG. 15 is a perspective view of the finned heat sink depicted in FIG. 14.

Thus far, only the heat storage aspect of the planarized thermal ballast (10) has been discussed. However, in practical use, heat accumulated in the PCM must ultimately be dissipated into the ambient environment. Also, from the perspective of a product designer it would be advantageous to integrate the thermal ballast (10) into the heat exchanger, i.e. a heat sink (50) having fins (52). Such heat exchangers are widely used in many electronic products to dissipate the heat produced during the product's operation. FIG. 14 and FIG. 15 illustrate one possible example in which the thermal ballast (10) is fully integrated into a heat sink (50) having fins (52). In an alternative embodiment not illustrated in the drawing FIGs the fins (52) could be hollow and filled with PCM (46).

An advantage of the integrated thermal design shown in FIGS. 14 and 15 is that when the system power consumption establishes an equilibrium temperature within normal parameters, the PCM (46) within the thermal storage layer (44) remains in its solid phase and has little or no influence on the operating temperature of relevant power components. However, if the product's power consumption increases such that it exceeds the heat dissipation capability of the heat sink (50), excess heat will be stored in the PCM (46) present within the thermal storage layer (44) thereby forestalling the product from exceeding its maximum operating temperature for some interval of time.

Figure 16:
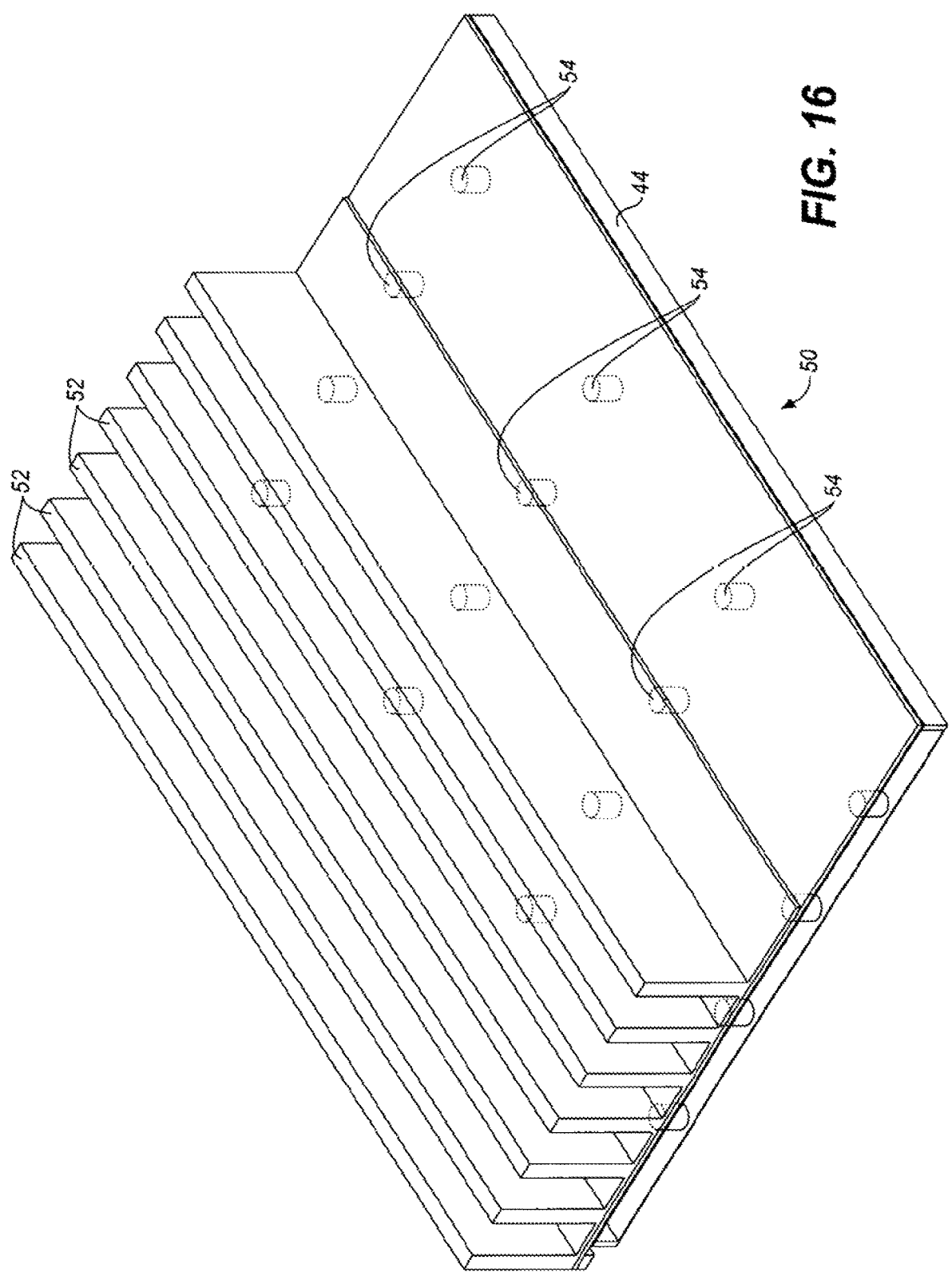
FIG. 16 is a perspective view of an alternative embodiment of the finned heat sink depicted in FIGS. 14 and 15 that further including thermal vias for increasing heat conduction into the PCM.

Various design alternatives for the heat sink (50) are possible. For example, since all practical PCMs (46) currently identified have a relatively low thermal conductivity, creating a cavity in the base of a finned heat sink (50) and filling the cavity with a PCM (46) could impede the heat conduction from source to sink (i.e. the fins (52)). Secondly, as demonstrated by the thermal modeling of the planarized thermal ballast (10) described in greater detail below, the effective performance of the PCM (46) is strongly affected by how well and how intimately the highly thermal conductive layer (42) can transfer heat into the PCM (46). One way in which the preceding issues can be ameliorated illustrated in FIG. 16 is to include an array of thermal vias (54) from the heat sink base through the PCM containing thermal storage layer (44). Here, the term "thermal via" is appropriated from printed circuit board (PCB) design where multiple small holes are drilled into a PCB, particularly around power components, which holes are then subsequently electroplated with metal to allow heat transfer from one layer of the PCB to other layers thereof. However, in the instance of the thermal ballast heat sink (50) depicted in FIG. 16, the thermal vias (54) are more likely to be small solid metal posts.

As would be apparent to those skilled in the art, there exist many practical uses for the thermal ballast (10) and the heat sink (50) as described herein other than for use in thermal protection of LEDs (01) included in the LED array (05, 21). Any product or system, for example, a battery powered data processor or circuit board, that needs to extend its operating time during adverse thermal operating conditions could benefit from use of a PCM-based, thermal ballast as described herein. It is anticipated that such embodiments could be relatively small and would mount on, over or adjacent to such critical heat-generating components.

While a PCM-based thermal ballast (10) can significantly increase the amount of heat that can be temporarily absorbed from a heat source, ultimately, the thermal ballast (10) has a finite heat absorbing capacity. Therefore, and as discussed in detail above, part of the thermal design of this or any heat absorbing system must include a means by which the PCM can externally dissipate absorbed heat. In the instance of the BLU (18) systems described herein, typically the DPS (13) monitors the overall system thermal environment and prevents the system from inadvertent thermal overload. The primary means for avoiding thermal overload is by allowing sufficient time for the system to dissipate excess heat into the ambient environment. This scenario will be subsequently discussed in greater detail.

It should be noted that, due to thermal expansion of PCM (46), leakage thereof might possibly occur with a more ridged containment vessel such as the thermal storage layer (44) illustrated in FIGS. 11 and 12 than with the pouch (48) illustrated in FIG. 13. This leakage possibility, which can be avoided in several different ways, arises if the PCM (46) when heated expands more than the concurrent expansion of the thermal storage layer (44). One technique for avoiding leakage is if during filling and subsequent sealing of the thermal storage layer (44) the PCM (46) is maintained at or above the maximum operating temperature of the thermal ballast (10). Presuming that the PCM (46) expands when heated, in this way the volume occupied by the PCM (46) will never exceed the capacity of the thermal storage layer (44) thereby avoiding any buildup of a positive pressure within the thermal storage layer (44). Alternatively, the thermal storage layer (44) can be slightly underfilled to thereby leave a small amount of air or other gas within the thermal storage layer (44) after sealing. The operation of the thermal ballast (10) will be optimized if such a bubble air or other gas within the thermal storage layer (44) is just large enough to accommodate thermal expansion of the PCM (46). Other practical ways for avoiding leakage of the PCM (46) due to thermal expansion that are not described above might be developed for fabricating a thermal storage layer (44) that operates in accordance with the present disclosure.

Alternatively, if the thermal storage layer (44) includes a plate of porous metal the plate is immersed in a bath of PCM (46) that has been heated to above its transition temperature. If a chemical barrier layer is needed between the porous metal and the PCM (46), before immersion the porous metal plate is first filled with a chemical barrier material such as a polymeric material perhaps silicone that has been diluted in a solvent which solvent is then evaporated out leaving only a thin coating of the polymeric material on the walls of the porous metal plate's open cells. While maintaining the PCM (46) above its transition temperature, the bath including the immersed porous metal plate is placed in a vacuum chamber that is then evacuated to remove air. The vacuum level needs to be only in a range of 0.1 mm to 5.0 mm of mercury although, depending upon vacuum pressure's efficacy, a lower or higher vacuum than this range may be useful. After reaching the desired vacuum level, the chamber is backfilled thereby forcing the PCM into the open pores of the metal plate. After the porous metal plate now infused with the PCM (46) has returned to atmospheric pressure and allowed to cool to below the transition temperature of the PCM (46), coating the PCM filled plate with a polymeric sealing material such as a liquid silicone which is then either air and/or catalytically cured completes fabrication of the thermal storage layer (44).

To illustrate the operating time extension that is readily obtained by employing the PCM based, planarized thermal ballast (10) as described herein, a specific example is evaluated. The LED backlight in a battery operated, 10.1 inch diagonal, WXGA (i.e., 1280×800 resolution) LCD module (08) nominally consumes 4 watts (4 W) of electrical power. FIG. 11 and FIG. 12 show the mechanical design of the PCM-based, planarized thermal ballast (10) used as the basis for thermal modeling. The LEDs (01) in the 10.1 inch diagonal, WXGA's backlight are able to operate within their normal operating temperature limits as long as battery power does not exceed 4 watts. The thermal model of the 10.1 inch diagonal, WXGA's backlight calculates the temperature of the LEDs (01) of the LED array (05, 21) of the BLU (18) over time at four power input levels: 4 W, 8 W, 12 W and 16 W. The LED array (05, 21) includes a 215×4.5×1.5 mm aluminum strip with a printed circuit on the upper surface thereof (i.e., facing away from the highly thermally conductive graphite layer (42). The LED array (21) is thermally coupled to the long edge of a 1.0 mm thick highly thermally conductive graphite layer (42) having an in-plane thermal conductivity of 400 W/(m·K), and is laminated to a 215× 115×4.5 mm PCM filled thermal storage layer (44) depicted in FIGS. 11 and 12. The PCM (46) filling the thermal storage layer (44) changes phase at 65° C. The maximum allowable operating temperature for the LEDs (01) is 85° C.

Heat from the LEDs (01) enters the BLU (18) at the LED array (05, 21). Heat exits the portable tablet (06) primarily from the outer surface of the thermal storage layer (44) (i.e., its bottom surface) at a rate of 5 W/(m$^2$/K). For comparison, the temperature of the LEDs (01) versus time at 4 W electrical power input to the LED array (05, 21) is appears in all three graphs (i.e. in FIGS. 17, 18 and 19). Note that at 4 W input to the LED array (05, 21), the operating temperature of the LEDs (01) reaches a maximum approximately 64° C. which does not cause the PCM (46) to change phase.

FIG. 17 shows the operating temperature of the LEDs (01) versus operating time with 8 W of input power to the LED array (05, 21). Curve G1-1 shows that in the absence of a PCM phase change the LEDs (01):

1. reach their maximum operating temperature i.e. 85° C., in approximately 60 minutes; and
2. afterwards the LEDs (01) would be operating above their maximum allowed 85° C. operating temperature.

Curve G1-2 shows the operating temperature rise of the LEDs (01) for the graphite thermal ballast (10) when the PCM (46) within the thermal storage layer (44) changes phase. The operating temperature of the LEDs (01) remains under 85° C. for nearly 160 minutes, more than doubling the safe operating time in comparison with when a phase change does not occur as depicted in curve G1-1. By way of comparison, curve G1-3 shows the result of replacing the thermal storage layer (44) filled with PCM with an aluminum thermal ballast (10) of the same dimensions. Curve G1-4 demonstrates that using a multilayered PCM design for the thermal ballast (10) further slows the operating temperature increase of the LEDs (01). Note that any of the planarized thermal ballast (10) that includes PCM (46), depicted in the curves G1-2 and G1-4, nearly doubles the safe operating time in comparison with using an aluminum thermal ballast (10) of the same dimensions shown by the curve G1-3.

FIG. 18 shows the operating temperature of the LEDs (01) versus operating time with 12 W of input power to the LED array (05, 21). Curve G2-1 shows that in the absence of a PCM phase change the LEDs (01) reach their maximum operating temperature i.e. 85° C., in approximately 29 minutes. Curve G2-2 shows the result when the PCM (46) within the thermal storage layer (44) changes phase. The operating temperature of the LEDs (01) remains under 85° C. for approximately 60 minutes, more than doubling the operating time in comparison with when a phase change does not occur as depicted in curve G2-1.

Curve G2-3 shows that juxtaposing opposite sides of the highly thermally conductive layer (42) respectively with half thickness thermal storage layers (44) improves temperature control of the LEDs (01) during phase transition of the PCM (46).

Curve G2-4 shows the beneficial effect on the operating temperature of the LEDs (01) that results from:
1. doubling the overall heat conduction in the highly thermally conductive layer (42); and
2. juxtaposing opposite sides of the highly thermally conductive layer (42) respectively with half thickness thermal storage layers (44).

As illustrated in curve G2-4, the safe operating time for the LEDs (01) is increased by over 2.5× in comparison with an absence of a PCM phase change (i.e., curve G2-1).

Curves G2-2, G2-3 and G2-4 in FIG. 18 show that with substantially increased input power to the LEDs (01), the specific design and material selections in the planarized thermal ballast (10) can significantly reduce the rate of temperature increase in the LEDs (01) of the LED array (05, 21) when the LEDs (01) are supplied with a large amount of electrical power.

Finally, FIG. 19 shows the temperature of the LEDs (01) versus operating time with 16 W of input power to the LED array (05, 21). Curve G3-1 shows that, in the absence of a PCM phase change, the LEDs (01) reach their maximum operating temperature, i.e. 85° C., under the modeled conditions in approximately 18 minutes. Curve G3-2 shows the result when the PCM (46) within the thermal storage layer (44) changes phase. The operating temperature of the LEDs (01) stays under 85° C. for approximately 30 minutes.

Again, curves G3-2 and G3-3 illustrate how the performance of the planarized thermal ballast (10) can be improved by its specific design details. Particularly, the temperature rise of the LEDs (01) during the PCM phase transition can be flattened by improved heat flow into the PCM (46) within the thermal storage layer (44) thereby extending the system operating time.

Although the present disclosure has been described in terms of the presently preferred embodiment, it is to be understood that such disclosure is purely illustrative and is not to be interpreted as limiting. For a portable video monitor, the screen brightness can be temporarily increased almost instantaneously by as much as 2-6 times above its continuous operation brightness. However, a screen brightness increase of as little as 1.25× would still be within the scope of the present disclosure. Also within the scope of the present disclosure would be simply overdriving LEDs (01) of a conventional LED array (05), although as explained previously such operation carries a number of disadvantages. Consequently, without departing from the spirit and scope of the disclosure, various alterations, modifications, and/or alternative applications will, no doubt, be suggested to those skilled in the art after having read the preceding disclosure. Accordingly, it is intended that the following claims be interpreted as encompassing all alterations, modifications, or alternative applications as fall within the true spirit and scope of the disclosure including equivalents thereof. In effecting the preceding intent, the following claims shall:

1. not invoke paragraph 6 of 35 U.S.C. § 112 as it exists on the date of filing hereof unless the phrase "means for" appears expressly in the claim's text;

2. omit all elements, steps, or functions not expressly appearing therein unless the element, step or function is expressly described as "essential" or "critical;"

3. not be limited by any other aspect of the present disclosure which does not appear explicitly in the claim's text unless the element, step or function is expressly described as "essential" or "critical;" and 4. when including the transition word "comprises" or "comprising" or any variation thereof, encompass a non-exclusive inclusion, such that a claim which encompasses a process, method, article, or apparatus that comprises a list of steps or elements includes not only those steps or elements but may include other steps or elements not expressly or inherently included in the claim's text.

The invention claimed is:

1. A thermal ballast (10) adapted for temporarily storing heat generated during a heat generating device's operation thereby extending the device's operating time during an interval of adverse thermal operating condition, the thermal ballast (10) being comprised of:
   a. a highly thermally conductive layer (42) that is adapted for being thermally coupled to the heat generating device; and
   b. a thermal storage layer (44) that includes a porous material, and that is laminated to the highly thermally conductive layer (42).

2. The thermal ballast (10) of claim 1 wherein the highly thermally conductive layer (42) is a sheet of graphite.

3. The thermal ballast (10) of claim 1 wherein the highly thermally conductive layer (42) is a sheet of copper.

4. The thermal ballast (10) of claim 1 wherein the thermal storage layer (44) includes a material (46) that changes phase at a temperature below the heat generating device's maximum operating temperature.

5. The thermal ballast (10) of claim 4 wherein the material (46) that changes phase is microencapsulated.

6. The thermal ballast (10) of claim 4 wherein inner surfaces of the thermal storage layer (44) include a thin chemical barrier layer to prevent chemical reaction with the material (46) that changes phase at a temperature below the heat generating device's maximum operating temperature.

7. The thermal ballast (10) of claim 4 wherein the thermal storage layer (44) and the highly thermally conductive layer (42) are interleaved into a stack having multiple layers.

8. The thermal ballast (10) of claim 1 wherein the thermal storage layer (44) includes a combination of materials (46) that respectively change phase at differing temperatures which respectively are below the heat generating device's maximum operating temperature.

9. The thermal ballast (10) of claim 8 wherein the phase change materials (46) are individually microencapsulated and then mixed to form a homogeneous material which collectively undergoes phase changes at differing temperatures.

10. Ther thermal ballast (10) of claim 8 wherein the porous material infused with the phase change material (46)

that forms the thermal storage layer (44) further includes an integrally formed layer of solid material that provides the highly thermally conductive layer (42).

11. The thermal ballast (10) of claim 1 having at least two thermal storage layers (44), the highly thermally conductive layer (42) being laminated to one of the thermal storage layers (44) on opposite sides respectively of the highly thermally conductive layer (42).

12. The thermal ballast (10) of claim 1 wherein the highly thermally conductive layer (42) is aluminum.

13. The thermal ballast (10) of claim 12 wherein inner surfaces of the thermal storage layer (44) include a thin chemical barrier layer to prevent chemical reaction with a material (46) that changes phase at a temperature below the heat generating device's maximum operating temperature that is included in the thermal storage layer (44).

14. The thermal ballast (10) of claim 12 wherein thermal storage layers (44) includes a material (46):
   a. that changes phase at a temperature below the heat generating device's maximum operating temperature; and
   b. that is microencapsulated.

15. The thermal ballast (10) of claim 1 wherein the highly thermally conductive layer (42) includes a hollow heat sink (50):
   a. that also provides the thermal storage layer (44) of the thermal ballast (10); and
   b. the hollow heat sink (50) being filled with a material (46) that changes phase at a temperature below the heat generating device's maximum operating temperature.

16. The thermal ballast (10) of claim 1 wherein the porous material included in the thermal storage layer (44) is porous aluminum.

17. The thermal ballast (10) of claim 1 wherein pores within the porous material included in the thermal storage layer (44) are coated with a chemical barrier layer before the porous material is infused with the phase change material (46).

18. The thermal ballast (10) of claim 4 wherein the porous material infused with the phase change material (46) that forms the thermal storage layer (44) further includes an integrally formed layer of solid material that provides the highly thermally conductive layer (42).

\* \* \* \* \*